(12) United States Patent
Kennedy et al.

(10) Patent No.: US 6,298,391 B1
(45) Date of Patent: Oct. 2, 2001

(54) REMOTE PROCEDURE CALLING WITH MARSHALING AND UNMARSHALING OF ARBITRARY NON-CONFORMANT POINTER SIZES

(75) Inventors: Terry Kennedy, Darmstadt (DE); Christopher Gustav Ewbank, Seattle, WA (US); Dietmar Gaertner, Ober-Ramstadt (DE); Mario C. Goertzel, Kirkland, WA (US); Ryszard K. Kott, Redmond, WA (US); Nathaniel S. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/040,226

(22) Filed: Mar. 13, 1998

(51) Int. Cl.[7] .................................................. G06F 9/00
(52) U.S. Cl. ..................... 709/328; 709/104; 709/101
(58) Field of Search ........................... 709/304, 310–332; 395/701

(56) References Cited

U.S. PATENT DOCUMENTS

| 5,577,251 |   | 11/1996 | Hamilton et al. |   |
|---|---|---|---|---|
| 5,737,607 | * | 4/1998  | Hamilton et al. | 395/701 |
| 5,778,228 | * | 7/1998  | Wei et al.      | 709/304 |
| 5,887,172 | * | 3/1999  | Vasudevan et al.| 709/304 |
| 5,926,636 | * | 7/1999  | Lam et al.      | 709/304 |

FOREIGN PATENT DOCUMENTS

| 0766172A1 | 4/1997 | (EP) . |
| 0817022A2 | 1/1998 | (EP) . |
| 0817027A2 | 1/1998 | (EP) . |

OTHER PUBLICATIONS

Don Box, "Q&A ActiveX/COM : Marshal by value", MSDN online, 3/97, pp. 1–10.*

Don Box, "Q&A ActiveX/COM : Arrays and IDL", MSDN online, 11/96, pp. 1–10.*

Maybee et al, "Multilanguage Interoperability in Distributed Systems", IEEE online, 1996, p. 451–463.*

Orfali, Harkey, Edwards, "Essential Client/Server Survival Guide," chapter 9, pp. 119–128 (1994).*

Brockschmidt, "Inside Ole (second edition)," chapter 6, pp. 227–338 (1995).*

Software Product Description, "Digital Distributed Computer Environmental (DCE) Privacy Option, Version 1.3 for Open VMS VAX and Alpha[R]," http://www.digital.com/info/SP6036, 3 pp. (1996).

(List continued on next page.)

Primary Examiner—Majid Banankhah
(74) Attorney, Agent, or Firm—Klarquist Sparkman, LLP

(57) ABSTRACT

A remote procedure call marshaling architecture provides remote procedure call interoperability between computers having arbitrary native data format pointer sizes not conforming to an on-wire multicanonical data representation of the remote procedure calls. The architecture includes an interface description language compiler having a code path generic to effecting marshaling of data structures containing non-conformant pointers. When compiled to run on a computing platform having a native, non-conformant pointer size, the code path is automatically configured to effect marshaling of data structure containing pointers of the computing platform's native pointer size.

19 Claims, 9 Drawing Sheets

OTHER PUBLICATIONS

Unix Version 4.0D Documentation, "Appendix A: Using 32–Bit Pointers on Digital Unix Systems," http://www.unix-.digital.com/faqs/publications/base1 doc/DOCUMENTATION/V40D HTML/APS30DTE/DOCU_OO6.HTM, 5 pp., (1997).

Smith, Duane A., "Adding 64–Bit Pointer Support to 32–Bit Run–time Library," Digital Technical Journal, vol. 8, no. 2, 83–95, 17 pp. printed (1996).

Harvey et al., "Extending OpenVMS for 64–bit Addressable Virtual Memory," Digital Technical Journal, vol. 8, No. 2, 57–71, 20 pp. printed (1996).

Benson et al., "The OpenVMS Mixed Pointer Size Environment," Digital Technical Journal, vol. 8, No. 2, 72–82, 16 pp. printed (1996).

Unix Version 4.0D Documentation, ONC RPC Manual, "About This Manual," http://www.tru64unix.compaq.com/faqs/publications/base1 doc/DOCUMENTATION/V40D HTML/AQ0R5BTE/DOCU OO1.HTM, 3 pp., (1997).

Unix Version 4.0D Documentation, ONC RPC Manual, "Introduction to Remote Procedure Calls," http://www.tru64unix.compaq.com/faqs/publications/base doc/DOCUMENTATION/V40D HTML/AQ0R5BTE/DOCU OO2.HTM, 6 pp., (1997).

Unix Version 4.0D Documentation, ONC RPC Manual, "Writing RPC Applications with the rpcgen Protocol Compiler," http://www.tru64unix.compaq.com/faqs/publications/base1 doc/DOCUMENTATION/V40D HTML/AQ0R5BTE/DOCU OO3.HTM, 25 pp., (1997).

Unix Version 4.0D Documentation, ONC RPC Manual, "RPC Programming interface," http://www.tru64unix.compaq.com/faqs/publications/base doc/DOCUMENTATION/V40D HTML/AQ0R5BTE/DOCU OO4.HTM, 31 pp., (1997).

Unix Version 4.0D Documentation, ONC RPC Manual, "Appendix A: External Data Representation: Technical Notes," http://www.tru64unix.compaq.com/faqs/publications/base doc/DOCUMENTATION/V40D HTML/AQ0R5BTE/DOCU OO5.HTM, 22 pp., (1997).

Software Product Description, "Distributed Computing Environment (DCE) Version V2.0a for Digital UNIX," http://www.digital.com/info/QA007J, 9 pp. (1997).

* cited by examiner

FIG. 9

```
//
// This macro is used to align a buffer. It modifies the pointer
// value (pStuff) so that it is a multiple of cAlign + 1.
// PTR_UTYPE is an unsigned integral type whose size is equal to
// the native pointer size (sizeof(PTR_UTYPE) = sizeof(void*))
// Previously
// #define ALIGN(pStuff, cAlign)                                      \
//        pStuff = (byte*)((ULONG)((pStuff) + (cAlign)) & ~(cAlign))
// where sizeof(ULONG) = 4.
//
#define ALIGN(pStuff, cAlign)                                         \
        pStuff = (byte*)((PTR_UTYPE)((pStuff) + (cAlign)) & ~(cAlign))
```

FIG. 10

```
//
// This data structure is used during unmarshalling in the MIDL
// generated stub code.
//
struct MIDL_STUB_MESSAGE {
    ...
    // This field is used to store pointer values inside the NDR
    // engine. See above for a discussion on PTR_UTYPE vs. ULONG
    PTR_UTYPE     BufferLength;
    // Previously
    // ULONG      BufferLength;
};
```

FIG. 11

```
//
// This routine sets the wire size and in-memory size of each of the
// base data types known to the MIDL compiler.
//
...
// pNode is a pointer to the node representing the variable.
// Branch based on the variable's type
switch (pNode->NodeType()) {
...
case NODE_LONG:         // 32-bit integer
case NODE_FLOAT:                // 32-bit floating point number
// case NODE_POINTER:   // pointer (non-portable; remove)
        WireSize = 4;
        MemorySize = 4;
        break;

// Previously the case above was used
case NODE_POINTER:      // pointer (portable)
WireSize = 4;                   // NDR standard
        MemorySize = sizeof(void*);     // generic
        break;
...
}
...
```

FIG. 12

```
//
// This routine determines whether this array is complex or not.
//
...
// Branch based on the type of this array's elements
switch (GetElementType()) {
...
case ELEMENT_POINTER:
        // Previously all that was checked for was whether or not this
        // was an array of reference pointers or not.
        // The array is complex if the memory size is greater than the
        // wire size (as determined by the above routine) OR the sizes
        // are equal and this is an array of reference pointers
// (reference pointers can never be NULL and therefore the
// pointer's value is never placed on the wire - wire size is
// effectively 0).
if ((MemorySize > WireSize) || (MemorySize <= WireSize &&
   IsRefPtr())) {
                return TRUE;
}
else {
        return FALSE;
}
        break;
}
...
```

FIG. 13

```
//
// This routine marshals a pointer to anything.
//
...
// pFormat is the "MIDL format string" which describes the type and
// size of each variable.
// pMemory is a pointer to the variable in the marshalling process'
// address space.
// pBuffer is a pointer into the RPC buffer.
// Branch on the pointer type
switch (*pFormat) {
case REFERENCE_POINTER:
        // Remember that a reference pointer cannot be NULL and has no
        // value in the RPC buffer.
        // Sanity check
if (pMemory == NULL ) {
                RaiseException(NULL_REFERENCE_POINTER_NOT_ALLOWED);
}
break;

default:            // Other pointer types
        // What we put into the RPC buffer is a flag indicating whether
        // this pointer is NULL or not. For 32-bit pointers we can just
        // use the pointer's value in the marshalling process' address
        // space. For pointers > 32-bits we put a flag into the RPC
// buffer
        if (sizeof(void*) == 4) {
                // 32-bit pointers
                *(long *)pBuffer = pMemory;
}
else {
        *(long *)pBuffer = (pMemory != NULL) ? TRUE : FALSE;
}
// Increment the buffer pointer by 4 bytes (the NDR standard)
pBuffer += 4;
}
// Increment the memory pointer past the pointer in a generic fashion
pMemory += sizeof(void*);

// Now marshal what is pointed to
...
```

FIG. 14

```
// This routine unmarshalls a complex array.
...
// Previously this code was only executed for arrays of reference
// pointers and if the algorithm had not been modified the pointer's //.value
// in this address space would be written back into the RPC buffer,
// causing failure.
// pFormat is the "MIDL format string" which describes the type and
// size of each variable.
// pMemory is a pointer to the variable in the marshalling process'
// address space.
// pBuffer is a pointer into the RPC buffer.
// Count is the number of elements in the array.
// Is this an array of pointers?
if (IsPointer(*pFormat)) {
        // Unmarshal reference and other pointers in the same way
        byte* pPointerValue = 0;
        long* pPointerWireValue = (long*)pBuffer;

// For each array element...
        while (Count > 0) {
                // Initialize the pointer's value with its wire value
                if (*pFormat != REFERENCE_POINTER) {
                        pPointerValue = (byte*)(*pPointerWireValue);
                        // Move pPointerWireValue to the next pointer wire
// value
pPointerWireValue++;
}
else {
        // Reference pointer
        pPointerValue = pMemory;
}
                // Unmarshal into pPointerValue rather than back into the
// RPC buffer
...
// Update the memory with the pointer's value in the
// unmarshalling process' address space
*(byte **)pMemory = pPointerValue;

// Increment the memory pointer generically
pMemory += sizeof(void*);
                // Decrement the counter
                Count--;
}
// Move the RPC buffer pointer past the array of pointer values
pBuffer = (byte *)pPointerWireValue;
}
```

REMOTE PROCEDURE CALLING WITH MARSHALING AND UNMARSHALING OF ARBITRARY NON-CONFORMANT POINTER SIZES

FIELD OF THE INVENTION

The present invention relates to remote procedure calls across a distributed network of potentially heterogeneous computers, and more particularly relates to marshaling and unmarshaling pointers of arbitrary sizes not conforming to an on-wire data representation in a reader-makes-right remote procedure call protocol.

BACKGROUND AND SUMMARY OF THE INVENTION

The Microsoft Distributed Component Object Model (DCOM) provides a remote procedure call (RPC) remoting facility (hereafter "DCOM RPC remoting facility") that allows transparent interface function calls across process and machine (i.e., computer) boundaries. (See, e.g., Brockschmidt, *Inside OLE, Second Edition* 277–338 (1995).) For transparency, the DCOM RPC remoting facility provides marshaling code (referred to as a "proxy") inside the process of a client program or component (the "client") that is making an interface call to an out-of-process or remote-computer-resident component (the "server component"), and also provides unmarshaling code (referred to as a "stub") in the process of the server component. The proxy receives the client's in-process interface call and marshals all data needed for the call (e.g., arguments and in-memory data) into a buffer for transfer to the stub over a communications channel (the "RPC channel") between the client and server processes or machines. The stub unmarshals the data from the buffer at the server component's process and machine and directly invokes the interface call on the server component. The stub also marshals any return value and "out" parameters returned from the interface call for transfer to and unmarshaling by the proxy for passing on to the client. This remote procedure calling is transparent to the client and server component in that the DCOM RPC remoting facility automatically provides the proxy, the stub and the RPC channel for marshaling the interface call across process and machine boundaries, such that the client and server component can perform the interface call as if both are on the same computer and in the same process.

The DCOM RPC remoting facility automatically creates the proxy and stub with marshaling code appropriate to a given server component interface based on a text description of the interface (including any data structures used by the interface). The interface description is written by the server component's developer in the Microsoft Interface Description Language (MIDL). MIDL is based on an industry standard RPC interface language called the Open Software Foundation Distributed Computing Environment Interface Definition Language (OSF DCE IDL). The DCOM RPC remoting facility includes a MIDL compiler that generates the proper marshaling code for the proxy and stub from the MIDL description of the interface being called.

The marshaling and unmarshaling code generated by the MIDL compiler for the proxies and stubs exchange data in a reader-makes-right protocol. In a reader-makes-right protocol, the proxy and stub write data into the RPC buffer (e.g., the proxy during the initial call, or the stub for return data) in a multicanonical representation (meaning that the representation supports multiple data formats) using any data format convenient to the writer, which is typically the data format of the computer on which the writer resides. The code on the other end that reads data from the RPC buffer (e.g., the stub during the initial call, or the proxy for return data) is then responsible for converting the RPC buffer data into the reader computer's native data format. In the case of an RPC call between processes on a same computer or between two homogenous computers (e.g., two computer with 32-bit Intel microprocessors running Microsoft Windows), both the reader and the writer have the same data format and therefore generally no conversion is needed. In the case of an RPC call between heterogeneous computers, conversion only takes place on the reading side of each exchange. By contrast, in a writer-makes-right protocol, the writer of the RPC buffer always converts data being marshaled into the RPC buffer from its native data format to a neutral or platform independent data format, and the reader always converts the RPC buffer data from the neutral format to the reader computer's native data format. The reader-makes-right RPC protocol thus is usually more efficient because data format conversions on one or both ends of the RPC call are avoided.

The DCOM RPC facility's proxies and stubs use the industry standard, DCE Network Data Representation (NDR) as the multicanonical representation of the RPC buffer data on the wire (i.e., for transmission between the proxy and stub). Pursuant to the NDR representation, the proxy and stub tag the RPC buffer data with the chosen data format of the RPC buffer data by including a header with flags set to indicate characteristics of the chosen data format. For example, the proxy and stub set header flags to indicate big-/little-endian, ASCII/EBCDIC, floating point variations, etc. This allows the reader of the RPC buffer to determine the data format of the RPC buffer data and perform translations to the reader's native data format if needed.

The NDR representation has the drawback that it supports only data formats with 32-bit pointers. This limitation constrains the DCOM RPC remoting facility to on-the-wire data formats with only 32-bit pointers. The native data format of several computer platforms, however, employ pointer sizes other than 32-bits. For example, some older computers (e.g., with 16-bit Intel microprocessors) use 16-bit pointers, whereas newer generation computers are now being introduced that use a 64-bit pointer size (e.g., computers based on the DEC Alpha processor). It is expected that computer platforms will be introduced in the future with other non-32-bit pointer sizes, e.g., 128-bit pointers. An effective cross-platform RPC facility, however, desirably provides interoperability in a heterogeneous computing environment including such computers whose native data format has a pointer size other than 32-bits. Accordingly, there is a problem of interoperability of the RPC remoting facility with computers whose natural data formats have pointer sizes that do not conform to the "on-the-wire" representation. This problem is hereafter referred to as the non-conformant pointer size problem.

A further constraint in this environment is that the DCOM RPC remoting facility is already deployed as the communications mechanism in many distributed network installations. It is therefore desirable to not change the RPC facility already installed on existing computers in these environments when computers having non-wire-representation-conformant pointer sizes are added.

Additional constraints on an effective solution to the non-conformant pointer size problem is that the optimized performance of the reader-makes-right protocol is preferably retained. Preferably, the solution also maximizes code retention, minimizes design changes, and does not alter the user interface of the existing deployed RPC facility.

Prior solutions have addressed the non-conformant pointer size problem on a case-by-case basis. In other words, prior solutions have provided marshaling/unmarshaling code that is effective for only a particular non-conformant pointer size. For example, the DCOM RPC remoting facility includes a non-conformant code path in the MIDL compiler to produce marshaling/unmarshaling code (i.e., proxies and stubs) specific to a computer with a 16-bit pointer size native data format (i.e., a computer platform employing the Microsoft Windows 3.x operating system, which has a 16-bit pointer size, on an Intel microprocessor). This non-conformant code path is specific to marshaling and unmarshaling the 16-bit Windows data format into the NDR representation RPC buffers, and does not handle any other non-conformant pointer sizes.

The present invention provides a generic solution to the non-conformant pointer size problem that supports marshaling and unmarshaling into the RPC buffer of any arbitrary size pointers not conforming to the on-wire data representation. The RPC facility of the invention includes an interface description language (IDL) compiler that generates marshaling and unmarshaling code (e.g., proxies and stubs) to write RPC buffer data in a multicanonical representation on a reader-makes-right protocol basis. The IDL compiler additionally includes routines to generate the marshaling and unmarshaling code in the proxies and stubs to accommodate marshaling and unmarshaling of any arbitrary non-conformant pointer size. When the IDL compiler is run on a computer having a data format with a non-conformant pointer size, this routine automatically generates the marshaling and unmarshaling code to properly translate any pointers being marshaled into the multicanonical representation in an RPC buffer.

In accordance with one aspect of the invention, the IDL compiler routine determines whether the data being marshaled into the RPC buffer is a complex structure whose size in memory is not the same as that in the multicanonical representation. In the case where the IDL compiler is run on a computer whose data format has a non-conformant pointer size, any data containing pointers is a complex structure. The IDL compiler then generates the marshaling/unmarshaling code of the proxy and stub to resize pointers in the structure to a size allowed by the multicanonical format as they are marshaled to the RPC buffer, and to the non-conformant pointer size when unmarshaled from the RPC buffer.

Additional features and advantages of the invention will be made apparent from the following detailed description of an illustrated embodiment which proceeds with reference to the accompanying drawings.

BRIEF DESCRIPTION OF THE DRAWINGS

FIG. 9 is a pseudo-code listing of a macro for generic non-conformant size pointer marshaling according to the invention in the illustrated marshaling architecture of FIG. 2.

FIG. 10 is a pseudo-code listing of a data structure declaration that supports generic non-conformant size pointer marshaling according to the invention in the illustrated marshaling architecture of FIG. 2.

FIG. 11 is a pseudo-code listing of a MIDL compiler routine to set data type sizes for generic non-conformant size pointer marshaling according to the invention in the illustrated marshaling architecture of FIG. 2.

FIG. 12 is a pseudo-code listing of a MIDL compiler routine to determine whether a data structure is complex for generic non-conformant size pointer marshaling according to the invention in the illustrated marshaling architecture of FIG. 2.

FIG. 13 is a pseudo-code listing of a marshaling routine to marshal generic non-conformant size pointers according to the invention in the illustrated marshaling architecture of FIG. 2.

FIG. 14 is a pseudo-code listing of an unmarshaling routine to unmarshal a complex array containing generic non-conformant size pointers according to the invention in the illustrated marshaling architecture of FIG. 2.

DETAILED DESCRIPTION OF THE ILLUSTRATED EMBODIMENTS

The present invention is directed toward a method and system for generic non-conformant size pointer marshaling. In one embodiment illustrated herein, the invention is incorporated into a component-based remote procedure call (RPC) marshaling architecture 100 (FIG. 2) that forms part of an object model or system for a distributed network of computers, entitled "Microsoft Distributed Component Object Model" (DCOM), marketed by Microsoft Corporation of Redmond, Wash. Briefly described, this software provides transparent remote procedure calls across a distributed network of potentially heterogeneous computers. More specifically, the DCOM RPC marshaling architecture 100 provides automatic marshaling of interface function calls across process and machine boundaries using the DCE NDR multicanonical on-wire data representation and a reader-makes-right marshaling protocol.

Exemplary Operating Environment

Figure 1:
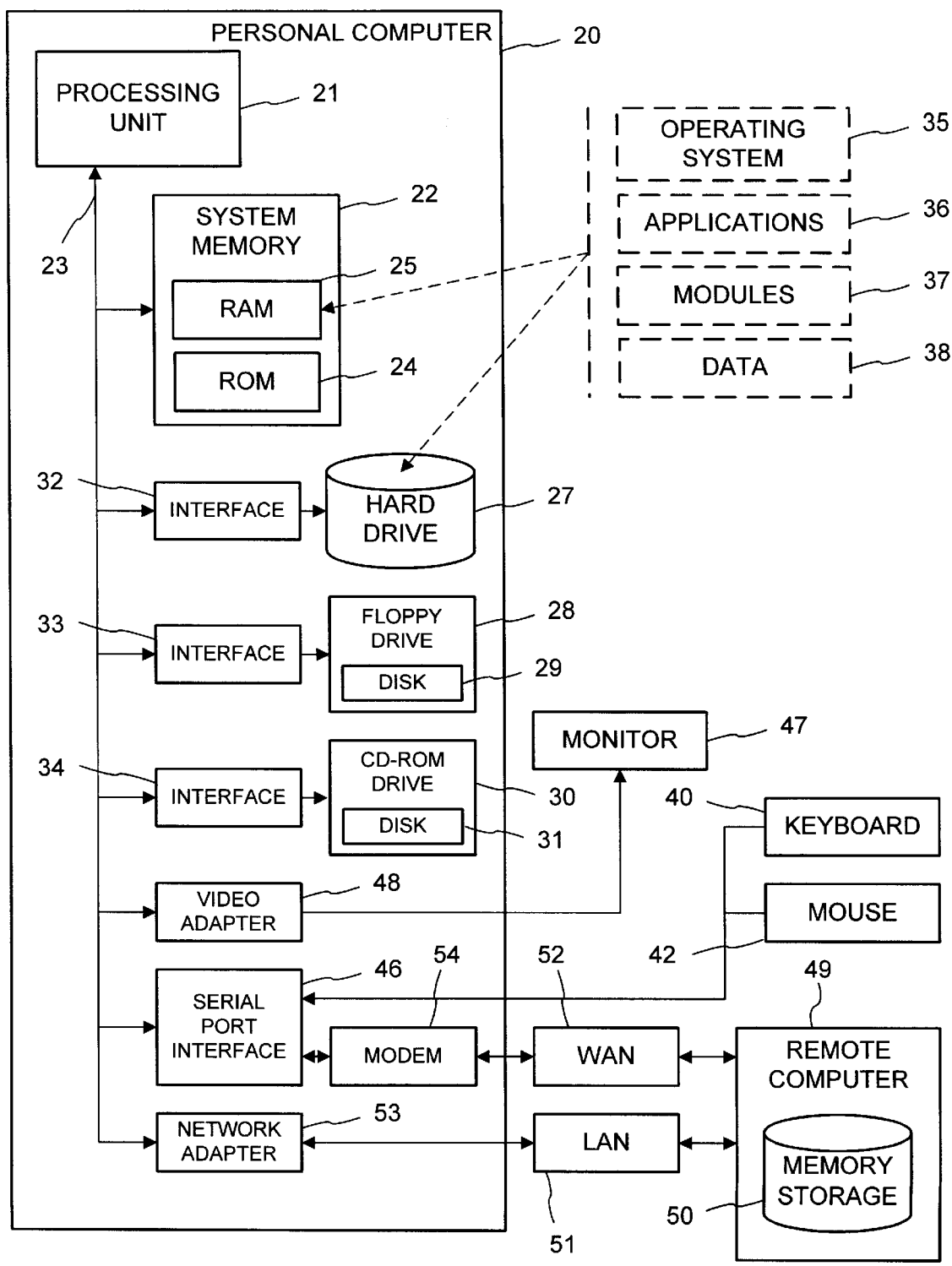
FIG. 1 is a block diagram of a computer system that may be used to implement a method and apparatus embodying the invention for marshaling and unmarshaling non-conformant pointer sizes.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, AGP, VESA, Microchannel, ISA and EISA, to name a few. The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Overview of DCOM RPC Remoting

Figure 2:
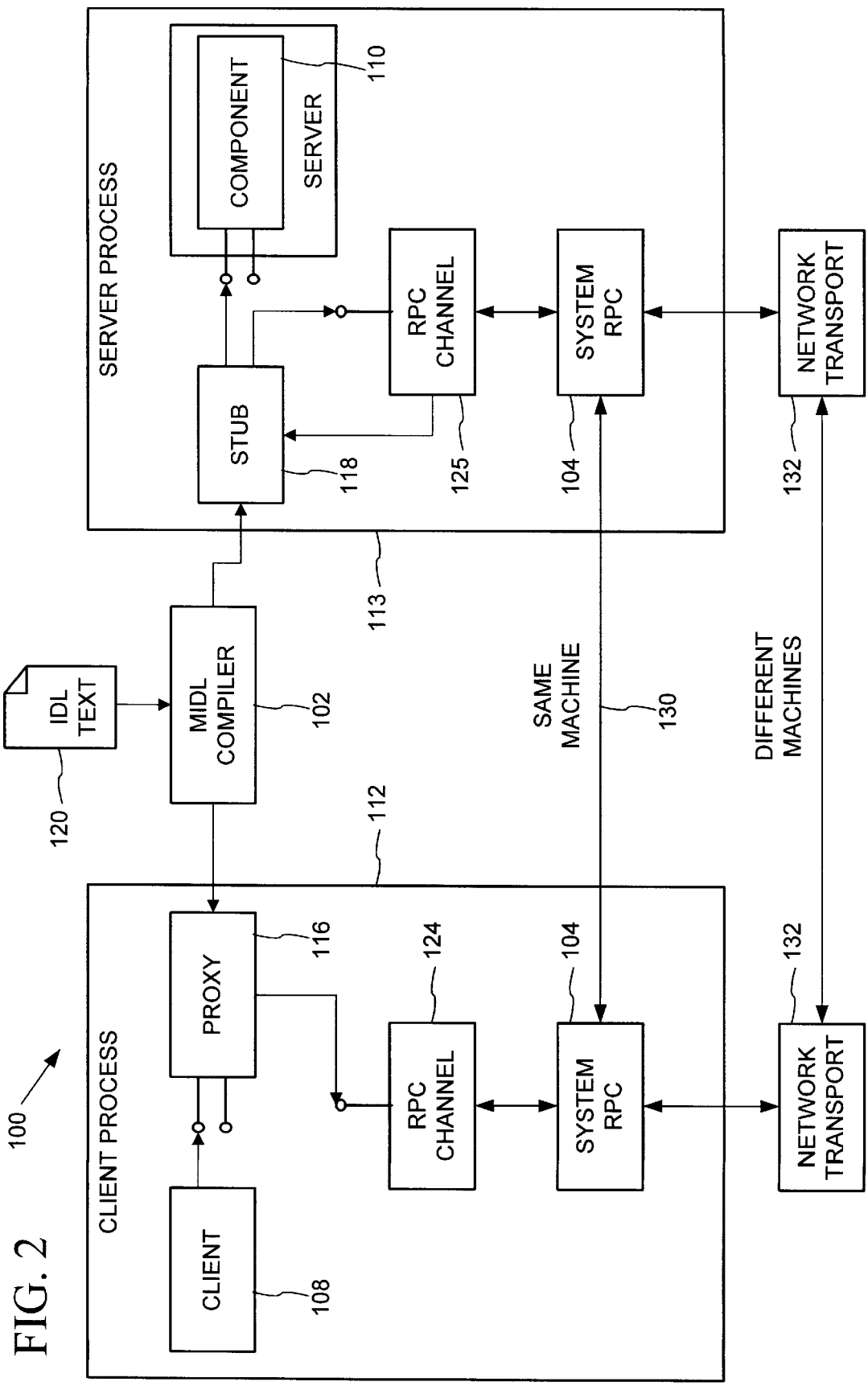
FIG. 2 is a block diagram of a standard marshaling architecture of the DCOM RPC remoting facility.

With reference now to FIG. 2, the DCOM RPC marshaling architecture 100 provides a Microsoft Interface Description Language (MIDL) compiler 102 and system RPC run time services ("system RPC") 104. The architecture 100 is built upon Microsoft's Component Object Model (COM) which defines a binary structure for object-oriented components, and together with Microsoft's Object Linking and Embedding (OLE), Distributed Component Object Model (DCOM) and related technologies provides a system for interoperable components that can be integrated from various sources to form software applications. The COM, OLE, DCOM and related technologies are well known in the art from many widely available publications, such as Brockschmidt, *Inside OLE, Second Edition* (1995), and Chappell, *Understanding ActiveX and OLE* (1996), both available from Microsoft Press.

Figure 4:
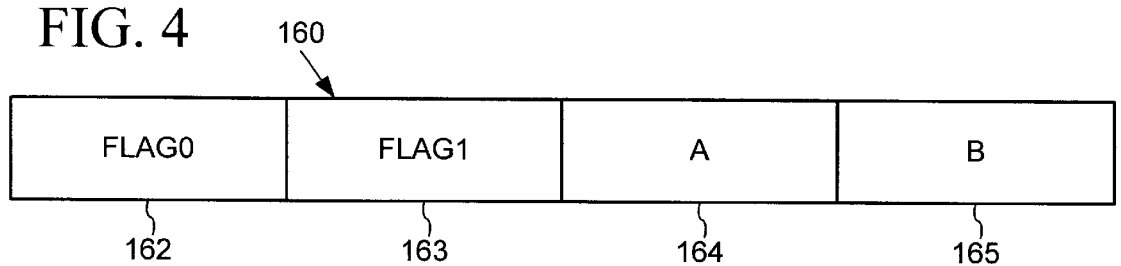
FIG. 4 is a block diagram of a multicanonical data representation (e.g., NDR) of the pointer array data structure of FIG. 3 as marshaled into an RPC buffer by the DCOM RPC of FIG. 2.

In response to a client 108 (which may be a COM component or other software program) requesting an interface pointer to an out-of-process or remote server component 110, the system RPC 104 causes the MIDL compiler 102 to generate code to marshal and unmarshal data between processes 112, 113 in which the client and server component run. The code for marshaling and unmarshaling on the client side (referred to as a "facelet," also implemented as a COM component) is included in a proxy 116 that is run in-process with the client. The MIDL compiler 102 constructs the proxy 116 to support a same interface structure as the requested interface of the server component 110. The client can then call this interface on the proxy 116 directly as an in-process call to interact with the server component 110. The proxy 116 responds to such calls by marshaling the necessary data (e.g., call parameters and related data structures in the client process' address space in memory) into an RPC buffer (an example of which is described below and illustrated in FIG. 4).

The code generated by the MIDL compiler 102 for marshaling and unmarshaling on the server side (referred to as a "stublet," and also implemented as a COM component) is included in a stub 118 that is run in-process with the server component 110 (which may reside on a same computer as the client or on a computer remote therefrom). The stub 118 handles direct interaction with the server component 110 by unmarshaling data sent from the proxy 116 into the server component process' address space and invoking the appropriate interface function call that the client initially invoked on the proxy 116. The stub further marshals a return value, out parameters, and related data structures from the server process' address space for transfer back to the client process 112.

The data to be marshaled at each end of the RPC call is known from a description (IDL text) 120 of the subject server component interface that is provided in the Microsoft Interface Description Language (MIDL) by the developer of the server component. Based on this description, the MIDL compiler 102 generates the appropriate code (the facelet and stublet) in the proxy 116 and stub 118 to marshal and unmarshal the needed data between the processes 112–113.

The system RPC 104 provides an RPC channel 124–125 in each of the client and server processes 112–113 which the proxy and stub use to communicate (i.e., to pass the RPC buffer). The RPC channel is an object from the COM library that encapsulates details of the underlying inter-process or network (inter-computers) transport. The RPC channel uses COM system services for communications across processes on the same machine (indicated at 130), and utilizes network transport programming interfaces 132 of the computer system for communications across machine boundaries.

The DCOM RPC marshaling architecture 100 (not including the generic non-conformant size pointer marshaling features of the present invention) is well known, and further details can be obtained from widely available publications, such as Brockschmidt, *Inside OLE, Second Edition* 277–338 (1995), among others. The generic non-conformant size pointer marshaling according to the invention enhances the illustrated DCOM RPC marshaling architecture 100 so as to extend the architecture for cross-platform interoperability with computers having any arbitrary pointer size.

Example of Marshaling a Non-Conformant Pointer Size

With reference to FIGS. 3–8, the following example shows marshaling an exemplary data structure 150 in the illustrated DCOM RPC marshaling architecture 100 (FIG. 2) in cases involving conformant and non-conformant pointer size data formats at the client and server sides. The exemplary data structure 150 is a simple array of pointers to long integers (i.e., 4 byte or 32-bit integer values), such as may be represented in the following C programming language declaration.

Figure 3:
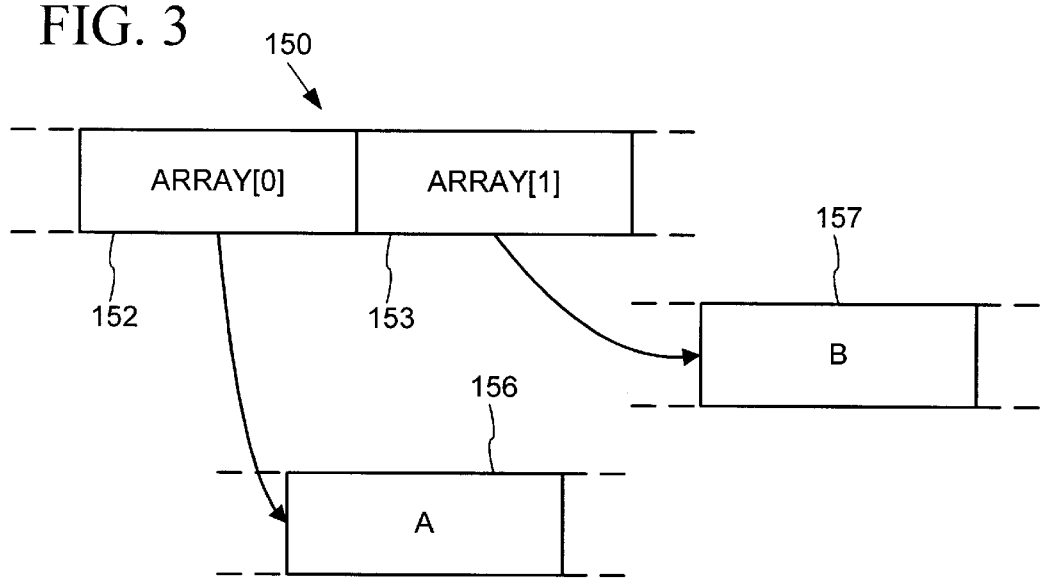
FIG. 3 is a block diagram of an exemplary pointer array data structure to be marshaled through the DCOM RPC remoting facility of FIG. 2.

The exemplary data structure 150 in this example has a layout in memory as shown in FIG. 3 in which memory locations 152–153 (e.g., in RAM memory 25 of the computer on which the client 108 of FIG. 2 resides) each contain 32-bit pointers that respectively reference memory locations 156–157. The memory locations 156–157, in turn, contain two long integer values (labeled A and B in FIG. 3). This corresponds to the following C programming language statements.

*(array[0])=A; *(array[1])=B;

In the illustrated marshaling architecture 100 of FIG. 2, the proxy 116 (or stub 118, depending on whether the data structure is marshaled as an in parameter or out parameter of the interface function call) must marshal both the pointers in the array and the two integer values A and B referenced by the pointers into an RPC buffer 160 (FIG. 4) for transport to the opposite process 112–113. In accordance with the NDR multicanonical representation, the pointers (array[0] and array[1]) are marshaled into the RPC buffer 160 as flags (flag0 and flag1) that indicate whether the respective pointer actually references a value in memory (i.e., whether the pointer is NULL or non-NULL). Since data is marshaled to and unmarshaled from the RPC buffer in a deterministic manner based on the MIDL description of the subject server component interface, this flag is sufficient for the unmarshaling code on the other side to recover which of the data values in the RPC buffer following the flag is referenced by each pointer.

According to the NDR multicanonical representation, the size of the flag for each pointer is 32-bits. The exemplary data structure 150 therefore can be marshaled into the RPC buffer 160 in the representation shown in FIG. 4, which consists of two 32-bit flags at buffer locations 162–163 for the two array pointers followed by the long integer values A and B at buffer locations 164–165 for a total of 16 bytes.

Figure 5:
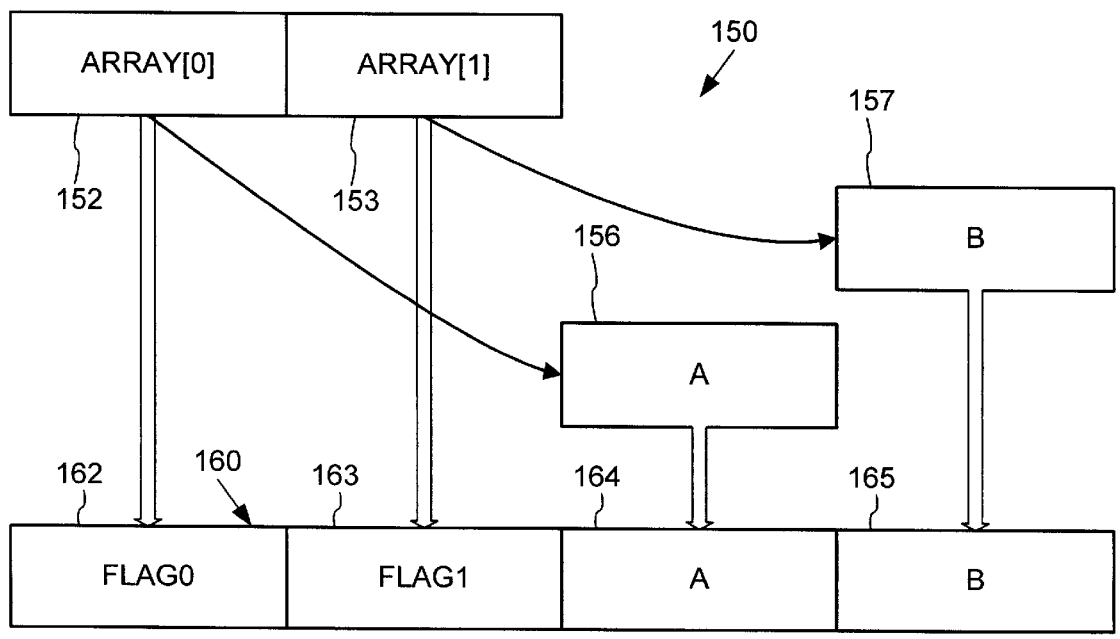
FIG. 5 is a block diagram illustrating marshaling the exemplary pointer array data structure of FIG. 3 into the RPC buffer in a case where the pointer size conforms to the on wire multicanonical data representation.

In a case where the pointer size of the marshaling process' natural data format is 32-bits, the proxy (or stub) that marshals the exemplary data structure 150 can effect the marshaling with a simple block copy of the pointer array (i.e., array[0] and array[1] at memory locations 152–153) into the buffer locations 162–163 as shown in FIG. 5. The values of the pointers thus act as the flags to indicate a NULL or non-NULL pointer. (A flag whose value is zero indicates a NULL pointer, whereas a non-zero flag indicates a non-NULL pointer). The integers A and B at the memory locations 156 and 157 referenced by the pointers are individually copied into the buffer locations 164–165.

Figure 6:
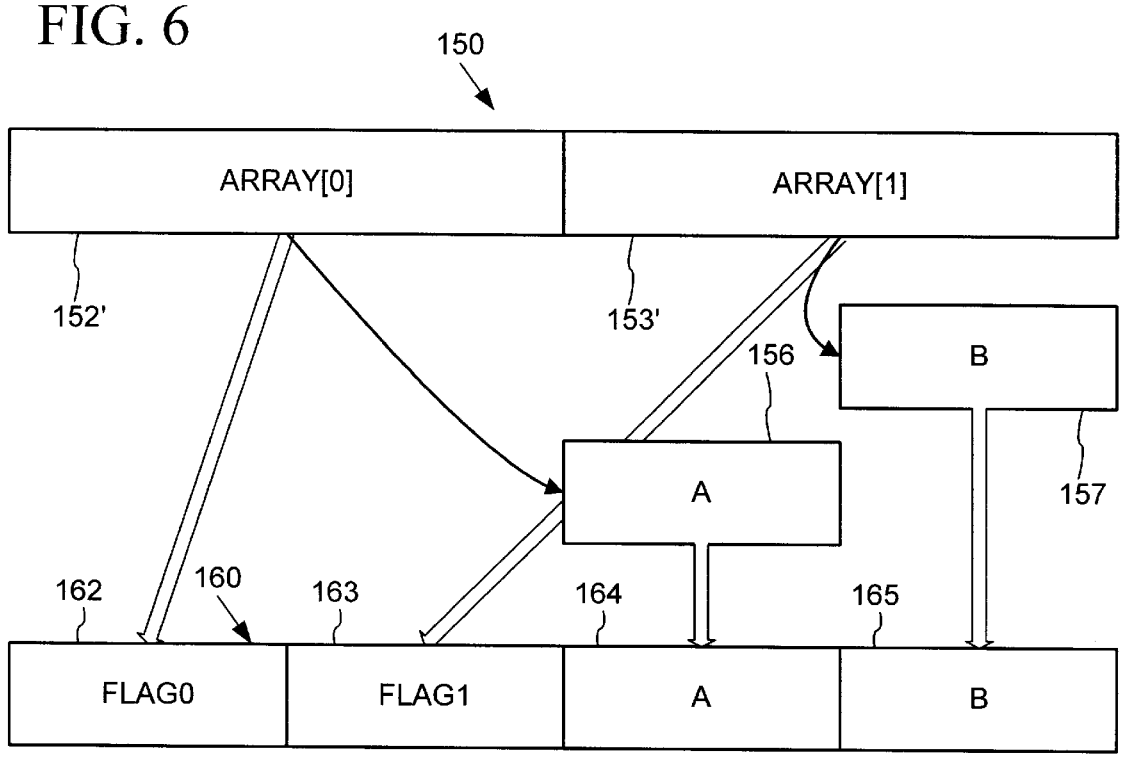
FIG. 6 is a block diagram illustrating marshaling the exemplary pointer array data structure with a non-conformant pointer size into the RPC buffer.

However, in a case depicted in FIG. 6 where the marshaling process' data format has a pointer size other than 32-bits (i.e., the case of a data format with a pointer size not conforming to the multicanonical on-wire representation), the marshaling code in the proxy 116 (FIG. 2) or stub 118 (FIG. 2) cannot simply blindly copy the pointer array from the process' address space into the RPC buffer 160. Instead, the pointers are marshaled individually from their memory locations 152' and 153' into the RPC buffer 160 (i.e., the marshaling code sets 32-bit NULL/non-NULL flags into the buffer locations 162–163 according to whether the 64-bit array pointers are or are not NULL). For example, where the array pointers (array[0] and array[1]) are 64-bits in size, the marshaling code individually checks whether each pointer is NULL and sets the corresponding flag in the RPC buffer accordingly. The integers A and B also are individually copied to the buffer locations 164–165.

In the target process on the other side of the RPC, the RPC buffer 160 is unmarshaled to place the exemplary data structure 150 into the target process' address space in the natural data format of the target process. If possible, the unmarshaling procedure is optimized by simultaneously copying (i.e., block copying) groups of the data elements in the RPC buffer over to a newly allocated buffer in the target process' address space, or unmarshaling the data elements in place in the RPC buffer (which is itself transferred to the target process' address space by the network transport 132 and system RPC 104 of FIG. 2). However, there are cases where these optimizations cannot be performed. An array which cannot be either unmarshaled in place in the RPC buffer or block copied, such as may be due to the need to resize pointers, is referred to herein as a Complex Array.

Figure 7:
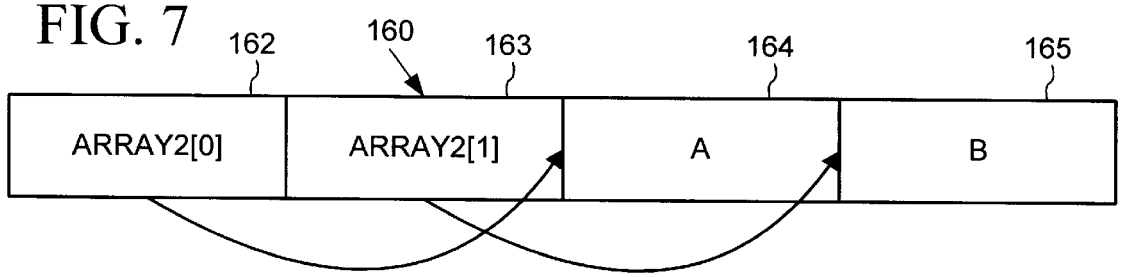
FIG. 7 is a block diagram illustrating unmarshaling the exemplary pointer array data structure from the RPC buffer of FIG. 4 into memory of a target computer having a pointer size conforming to the multicanonical data representation.

More particularly, in a case shown in FIG. 7 where the target process is running on a 32-bit computer and thus has a native data format with a 32-bit pointer size (i.e., an NDR conforming pointer size), the unmarshaling code can reuse the transferred RPC buffer 160 in the target process' address space and unmarshal the data elements in place. The unmarshaling code in the proxy or stub traverses the RPC buffer, and fixes each pointer in the data structure to reference the appropriate data element. In this example, the address of the buffer location 164 containing long integer A is placed in buffer location 162, and the address of the buffer location 165 that contains the long integer B is placed in buffer location 162. The exemplary data structure 150 is thus recreated in the target process' address space with the pointers array[0] and array[1] properly referencing their respective long integer values A and B.

Figure 8:
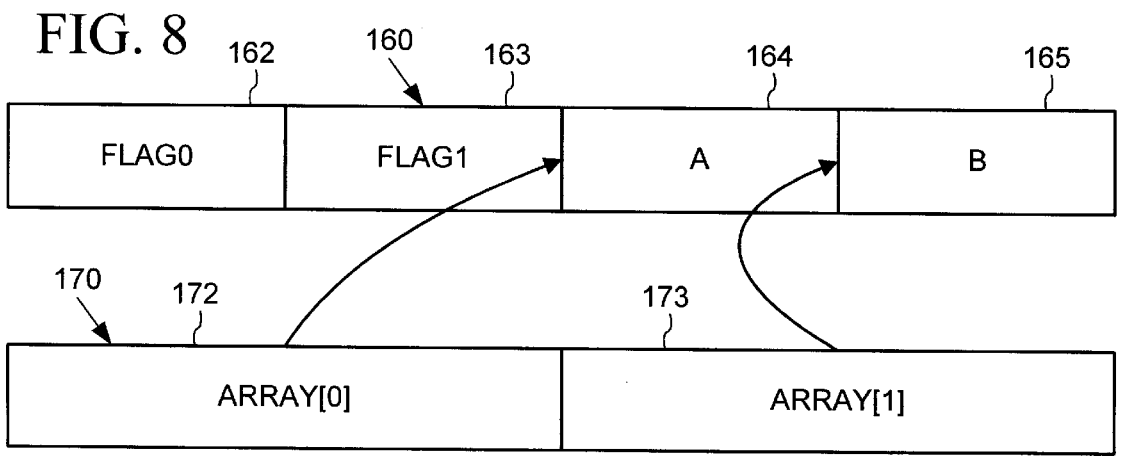
FIG. 8 is a block diagram illustrating unmarshaling the exemplary pointer array data structure from the RPC buffer of FIG. 4 into memory of a target computer having a non-conformant pointer size.

FIG. 8 depicts a case where the target process is running on a computer having a data format with a non-conformant pointer size (specifically, a size greater than that supported by the NDR multicanonical format, such as 64-bits). In this case, the exemplary data structure 150 cannot simply be unmarshaled in place in the RPC buffer as in FIG. 7 because additionally space is required to accommodate the larger size pointers. Accordingly, the unmarshaling code in the proxy or stub allocates a new buffer 170 of an adequate size to accommodate the larger size pointers. The unmarshaling code then copies data values over to the new buffer (as needed), and fixes the pointers to reference their respective data elements. In this case, the unmarshaling code allocates 16 bytes for the new buffer 170 to contain the two 64-bit pointers at new buffer locations 172–173, and then sets the addresses of the memory locations 164–165 containing the long integers A and B into the new buffer locations 172–173 of the two pointers. This creates the exemplary pointer array data structure in the target process' address space with the pointers sized appropriately for the native data format of the computer on which the process runs.

Generic Non-Conformant Pointer Size Marshaling

In accordance with the invention, the illustrated marshaling architecture 100 (FIG. 2) incorporates program code to generically marshal and unmarshal any arbitrary non-conformant pointer size. This generic non-conformant pointer size marshaling program code can be compiled to run on a computer platform having a data format with an arbitrary non-conformant pointer size using an industry standard compiler (e.g., a C programming language compiler) for that platform. The generic non-conformant pointer size marshaling program code running on the computer platform will then operate in the illustrated marshaling architecture 100 to properly marshal and unmarshal the arbitrary size pointers into the NDR multicanonical representation in the RPC buffer (e.g., RPC buffer 160 of FIG. 4). The generic non-conformant pointer size marshaling program code accommodates the arbitrary non-conformant size by simply compiling to the new computing platform, without having to write or rewrite any code to a specific pointer size. The illustrated marshaling architecture 100 can thus provide RPC interoperability in a distributed environment of heterogeneous computers, including currently available and future computer platforms having non-conformant pointer size data formats (e.g., current 64-bit computing platforms such as the DEC Alpha, as well as future computing platforms using any non-conformant pointer size). Further, the illustrated marshaling architecture 100 can thus be easily and rapidly deployed to these new computing platforms of different arbitrary non-conformant pointer sizes as the computing platforms are introduced.

When the illustrated marshaling architecture 100 incorporating the generic non-conformant pointer size marshaling program code is compiled to a computing platform, the generic non-conformant pointer size marshaling program code is configured to the specific pointer size of the computing platform's data format using the following programming language construct (e.g., in a header file of the illustrated marshaling architecture's source code):

MemorySize=sizeof(void*);

This programming language construct sets the program constant, MemorySize, to indicate the pointer size of the computing platform's native data format, and is used by routines in the generic non-conformant pointer size marshaling code to properly marshal and unmarshal pointers of that pointer size. The construct conforms to the ANSI C programming language standard, and is supported generally by compilers adhering to that industry standard. The generic non-conformant pointer size marshaling program code thus automatically configures itself to marshal and unmarshal the particular pointer size of the computing platform, without need for a developer to write marshaling code to a specific non-conformant pointer size.

With reference to FIGS. 9–14, the generic non-conformant pointer size marshaling code includes routines to marshal and unmarshal data containing pointers of the non-conformant pointer size as set by the above construct during compiling to the target computing platform. These routines include routines in the MIDL compiler 102 (FIG. 2), the proxy 116 (FIG. 2) and the stub 118 (FIG. 2) generated by the MIDL compiler 102, as well as the macros and data structures associated with 20 the MIDL compiler 102. Comments inserted in the routines in FIGS. 9–14 indicate comparisons to counterpart routines of the prior Microsoft DCOM RPC marshaling architecture that handle conformant-only pointers or are specific to a non-conformant pointer size.

In particular, FIG. 9 depicts a macro that is used in the illustrated marshaling architecture 100 to properly align the RPC buffer for any arbitrary pointer size, e.g., the pointer size of the computing platform as set by the above construct in compiling the marshaling architecture to the computing platform.

FIG. 10 illustrates a data structure used during unmarshaling in the MIDL compiler-generated stub 118 (FIG. 2) to store pointer values, and accommodates generic non-conformant pointer sizes.

FIG. 11 illustrates a routine in the MIDL compiler 102 that sets the wire size and in-memory size of each of the base data types known to the MIDL compiler. The routine employs a generic case statement to set the in-memory pointer size data type to indicate the arbitrary pointer size of the computing platform using the above-discussed programming language construct. The marshaling and unmarshaling code generated by the MIDL compiler can then perform appropriate marshaling and unmarshaling based on the set data type.

FIG. 12 illustrates a routine in the MIDL compiler 102 to determine whether the data structures that are to be marshaled for a particular interface are complex or not. In the case where the computing platform has a non-conformant pointer size and the data to be marshaled for an interface includes a non-null pointer, then the size of the data in memory differs from that in the RPC buffer and the data structure is considered complex. In the illustrated MIDL compiler 102, the routine checks whether the data contains a pointer. Then, if the pointer size of the computing platform is non-conformant (differs from the on-wire size as set in the routine shown in FIG. 11), the routine treats the data to be marshaled as complex (which requires resizing and/or individual copying).

FIG. 13 illustrates a routine in the MIDL compiler-generated proxy 116 or stub 118 to marshal an arbitrary non-conformant pointer size. For a complex structure (such as determined by the routine of FIG. 12), the routine individually marshals pointers from the in-memory data structure to the RPC buffer similar to the non-conformant pointer marshaling example shown in FIG. 6. The routine advancing through the in-memory data structure in increments of the arbitrary pointer size of the computing platform data format, and through the RPC buffer in increments of 4-bytes (per the NDR representation).

FIG. 14 illustrates a MIDL-generated routine to unmarshal an arbitrary pointer size. The routine allocates an appropriately-sized buffer to hold pointers of the arbitrary pointer size, and fixes the pointer values to reference the appropriate data values marshaled in the RPC buffer, similar to the non-conformant pointer unmarshaling example shown in FIG. 8.

The marshaling and unmarshaling routines for complex structures discussed above thus form a separate code path for marshaling and unmarshaling data containing non-conformant size pointers. In the illustrated embodiment, this code path is generic to marshaling and unmarshaling any arbitrary non-conformant pointer size, and is followed for marshaling data containing pointers when the data format of the particular computing platform has a non-conformant pointer size.

Having described and illustrated the principles of our invention with reference to an illustrated embodiment, it will be recognized that the illustrated embodiment can be modified in arrangement and detail without departing from such principles. It should be understood that the programs, processes, or methods described herein are not related to or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In particular, the routines shown in FIGS. 9–14 illustrate the implementation of the generic non-conformant pointer size marshaling code. It should be apparent to those skilled in the art that further routines and data structures in the marshaling architecture to accommodate any arbitrary non-conformant pointer sizes according to the invention can be formed applying like principles.

As a further example, the programming language compiler used to compile the generic non-conformant pointer size marshaling code to run on a particular target computing platform can be a compiler that runs on the target computing platform itself. Alternatively, the programming language compiler can be a cross-platform compiler running on a separate computing platform (e.g., a 32-bit computer) but compiling the generic non-conformant pointer size marshaling code to run on the target computing platform and handle marshaling of that target computing platform data format's non-conformant pointer size (e.g., 64-bits, 128-bits, etc.). When targeting a different platform, the compiler determines the pointer size of the target computing platform's data format using the following statement (e.g., in place of the MemorySize=sizeof(void*)" in FIG. 11).

MemorySize=Size_Of_TargetPlatformPointer where "Size_Of_TargetPlatformPointer" is a compiler constant.

As yet another example, the exemplary data structure 150 is intended to be illustrative of a wide variety of data structures containing pointers that can be marshaled in a remote procedure call between computers potentially having arbitrary, native non-conformant pointer size data formats. The generic non-conformant pointer size marshaling code in the illustrated marshaling architecture 100 (FIG. 2) operates to marshal data structures containing non-conformant pointers that may vary in one or many respects from the exemplary data structure. For example, the bit size of long integers on the computing platform may differ from 4-bytes. The data structure may be an array of pointers that reference data elements other than long integers, such as other length integers, floating point values, characters, character strings, unions, and more complex (e.g., user-defined) structures, among others. Even further, the data structure may contain pointer types other than reference and unique pointers (which are discussed in the marshaling example), such as full pointers.

In the latter case of full pointer marshaling, the on-wire format preferably is a NULL or a monotonically increasing integer (e.g., 1, 2, 3, 4, . . . ) for each different full pointer marshaled. Each full pointer that is marshaled is added to a dictionary, so that when the same full pointer is later marshaled, the same identifying integer is sent as its on-wire representation in the RPC buffer. For arbitrary non-conformant-sized pointers according to the invention, the marshaling code keeps dictionary entries of the following form.

struct entry {void *pointer, unsigned long wire_value}

A similar table is maintained by the unmarshaling code to map from the on-wire identifying integers to the appropriate pointers in the process address space of the unmarshaling code.

As another example, the marshaling routine illustrated in FIG. 13 shows setting the flag simply as a 1 or other constant value to indicate a non-NULL reference pointer (i.e., in the statement "? TRUE:FALSE"). It is often preferable, however, to fit as much of the original pointer value as possible into the RPC buffer on-wire representation of the pointer, e.g., as an aid in debugging. A routine for this is as follows.

```
if (original_pointer !=0)
    *(PULONG)marshalling_buffer++=((ULONG)
      orginal_pointer |1);
    // or better with ... | 0x80000000
else
    *(PULONG)marshalling_buffer++=0UL;
```

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of generically marshaling data for a remote procedure call from a data format with arbitrary pointer sizes not conforming to an on-wire multicanonical representation, the method comprising:

providing an interface definition language compiler having a routine for generating marshaling code to effect a remote procedure call, the routine having a code path generic to marshaling of data containing pointers of any arbitrary size not conforming to the on-wire multicanonical representation;

compiling the interface definition language compiler to run on a target computing platform having a non-conformant pointer size such that the code path of the routine becomes operative to generate marshaling code to effect marshaling of data containing pointers of the non-conformant pointer size; and running the interface definition language compiler on a computer having the target computing platform to generate marshaling code for issuing inter-computer remote procedure calls in the on-wire multicanonical representation on a distributed network.

2. The method of claim 1 wherein the interface definition language compiler contains a statement that automatically configures the code path to the non-conformant pointer size when the interface definition language compiler is compiled to run on the target computing platform.

3. The method of claim 1 wherein the interface definition language compiler further has a routine for generating unmarshaling code to effect a remote procedure call, the routine having a second code path generic to unmarshaling of data containing pointers of any arbitrary size not conforming to the on-wire multicanonical representation, the compiling the interface definition language compiler to run on the target computing platform causing the second code path to become operative to generate unmarshaling code to effect unmarshaling of data containing pointers of the non-conformant pointer size.

4. The method of claim 1 wherein the compiling the interface definition language compiler is performed using a programming language compiler resident on a computer of the target computing platform.

5. The method of claim 1 wherein the compiling the interface definition language compiler is performed using a cross compiler resident on a computer of a different second computing platform and operative to compile the interface definition language compiler to the target computing platform.

6. A marshaling architecture for remote procedure call interoperability in a distributed environment of heterogeneous computers potentially having a data format with an arbitrary pointer size not conforming to an on-wire multicanonical representation, the architecture comprising:

an interface definition language compiler for generating marshaling and unmarshaling code of a proxy and a stub to be run in-process of a client and a server component, respectively, the proxy receiving an interface function call from the client and causing the stub to issue the interface function call to the server component across process and machine boundaries via a remote procedure call, the proxy and the stub marshaling data from and unmarshaling data to their respective process through a remote procedure call buffer;

a generic non-conformant pointer size marshaling code path in the interface definition language compiler for generically effecting marshaling and unmarshaling by the proxy and the stub through the remote procedure call buffer of data containing pointers having any of a variety of arbitrary pointer sizes non-conformant with the on-wire multicanonical representation when run on a computer in the distributed environment having a native data format pointer size of the variety; and a remote procedure call transport for transferring the remote procedure call buffer in the multicanonical representation across the process and machine boundaries between the proxy and the stub.

7. The marshaling architecture of claim 6 which is compilable to a computing platform of one or more computers in the distributed environment where the computing platform has a native data format pointer size of the variety, to thereby cause the generic non-conformant pointer size marshaling code to effect marshaling and unmarshaling of data containing pointers of the computing platform's native data format pointer size when run on said computers.

8. A computer readable storage medium having computer-executable code stored thereon of a remote procedure call facility generic to marshaling remote procedure calls on computers having arbitrary native data format pointer sizes not conforming to a multicanonical representation, the remote procedure call facility comprising interface definition language compiling code for generating proxies and stubs for a remote procedure call between a client and server application on separate computers, and having a code path generic to marshaling data containing pointers of an arbitrary non-conformant pointer size for transfer via the remote procedure call in the multicanonical representation.

9. The computer readable storage medium of claim 8 wherein the interface definition language compiler is compiled to run on a computer having a native data format pointer size not conforming to the multicanonical representation whereby the code path is operative to generate proxies that marshal data containing pointers of the native data format pointer size for transfer via the remote procedure call in the multicanonical representation.

10. The method of claim 1 wherein issuing comprises:

checking whether a pointer in a memory buffer is null or non-null;

writing a flag value to a remote procedure call buffer, the flag value indicating whether the checked pointer is null or non-null, wherein the flag value has a size conforming to the on-wire multicanonical representation.

11. The method of claim 10 wherein issuing further comprises:

incrementing a memory buffer pointer by the non-conformant pointer size; and incrementing a remote procedure call buffer pointer by the size conforming to the on-wire multicanonical representation.

12. The method of claim 1 wherein issuing comprises:
for a pointer in a memory buffer, representing the pointer in a remote procedure call buffer;
incrementing a memory buffer pointer by the non-conformant pointer size; and
incrementing a remote procedure call buffer pointer by a size conforming to the on-wire multicanonical representation.

13. A method of initializing an interface definition language compiler for use on a computer of a computer platform type, the computer platform type having pointers with a size that differs from an RPC-wire standard, the method comprising:
providing an interface definition language compiler for generating RPC-enabling code, the interface definition language compiler including instructions for handling pointer data of an arbitrary pointer size in the RPC-enabling code;
with a platform-generic operation, automatically determining a platform pointer size for a computer, the platform pointer size differing from an RPC-wire standard;
based upon the determined platform pointer size, configuring the interface definition language compiler to generate RPC-enabling code that handles pointer data of the platform pointer size in an RPC-wire standard compliant manner.

14. A computer-readable storage medium having computer-executable code stored thereon for performing the method of claim 13.

15. The method of claim 13 wherein configuring the interface definition language compiler comprises:
setting a memory buffer pointer size value to the platform pointer size.

16. The method of claim 13 wherein RPC-enabling code includes instructions for:
determining if a pointer is null or non-null;
writing a flag value to an RPC buffer, the flag value indicating whether the pointer is null or non-null, wherein the flag value has an RPC-wire standard pointer size.

17. A method of initializing an interface definition language compiler for use on a computer of a computer platform type, the computer platform type having pointers with a size that differs from an RPC-wire standard, the method comprising:
providing an interface definition language compiler for generating RPC-enabling code, the interface definition language compiler including instructions for handling pointer data of an arbitrary pointer size in the RPC-enabling code;
determining a platform pointer size for a computer, the platform pointer size differing from an RPC-wire standard;
based upon the determined platform pointer size, configuring the interface definition language compiler to generate RPC-enabling code that handles pointer data of the platform pointer size in an RPC-wire standard compliant manner, wherein the RPC-enabling code includes instructions for:
determining if a pointer is null or non-null;
writing a flag value to an RPC buffer, the flag value indicating whether the pointer is null or non-null, wherein the flag value has an RPC-wire standard pointer size;
incrementing a memory buffer pointer by the platform pointer size; and
incrementing an RPC buffer pointer by the RPC-wire standard pointer size.

18. A method of initializing an interface definition language compiler for use on a computer of a computer platform type, the computer platform type having pointers with a size that differs from an RPC-wire standard, the method comprising:
providing an interface definition language compiler for generating RPC-enabling code, the interface definition language compiler including instructions for handling pointer data of an arbitrary pointer size in the RPC-enabling code;
determining a platform pointer size for a computer, the platform pointer size differing from an RPC-wire standard;
based upon the determined platform pointer size, configuring the interface definition language compiler to generate RPC-enabling code that handles pointer data of the platform pointer size in an RPC-wire standard compliant manner, wherein the RPC-enabling code includes instructions for:
determining if a pointer is null or non-null;
writing a flag value to an RPC buffer, the flag value indicating whether the pointer is null or non-null, wherein the flag value has an RPC-wire standard pointer size;
in a dictionary, associating a unique non-null pointer with a unique flag value for the unique non-null pointer; and
based upon the dictionary, when the unique non-null point is later marshaled, writing the unique flag value to the RPC buffer.

19. A method of initializing an interface definition language compiler for use on a computer of a computer platform type, the computer platform type having pointers with a size that differs from an RPC-wire standard, the method comprising:
providing an interface definition language compiler for generating RPC-enabling code, the interface definition language compiler including instructions for handling pointer data of an arbitrary pointer size in the RPC-enabling code;
determining a platform pointer size for a computer, the platform pointer size differing from an RPC-wire standard;
based upon the determined platform pointer size, configuring the interface definition language compiler to generate RPC-enabling code that handles pointer data of the platform pointer size in an RPC-wire standard compliant manner, wherein the RPC-enabling code includes instructions for:
for a pointer in a memory buffer, representing the pointer in an RPC buffer;
incrementing a memory buffer pointer by the platform pointer size; and
incrementing an RPC buffer pointer by an RPC-wire standard pointer size.

* * * * *